Patented Feb. 4, 1941

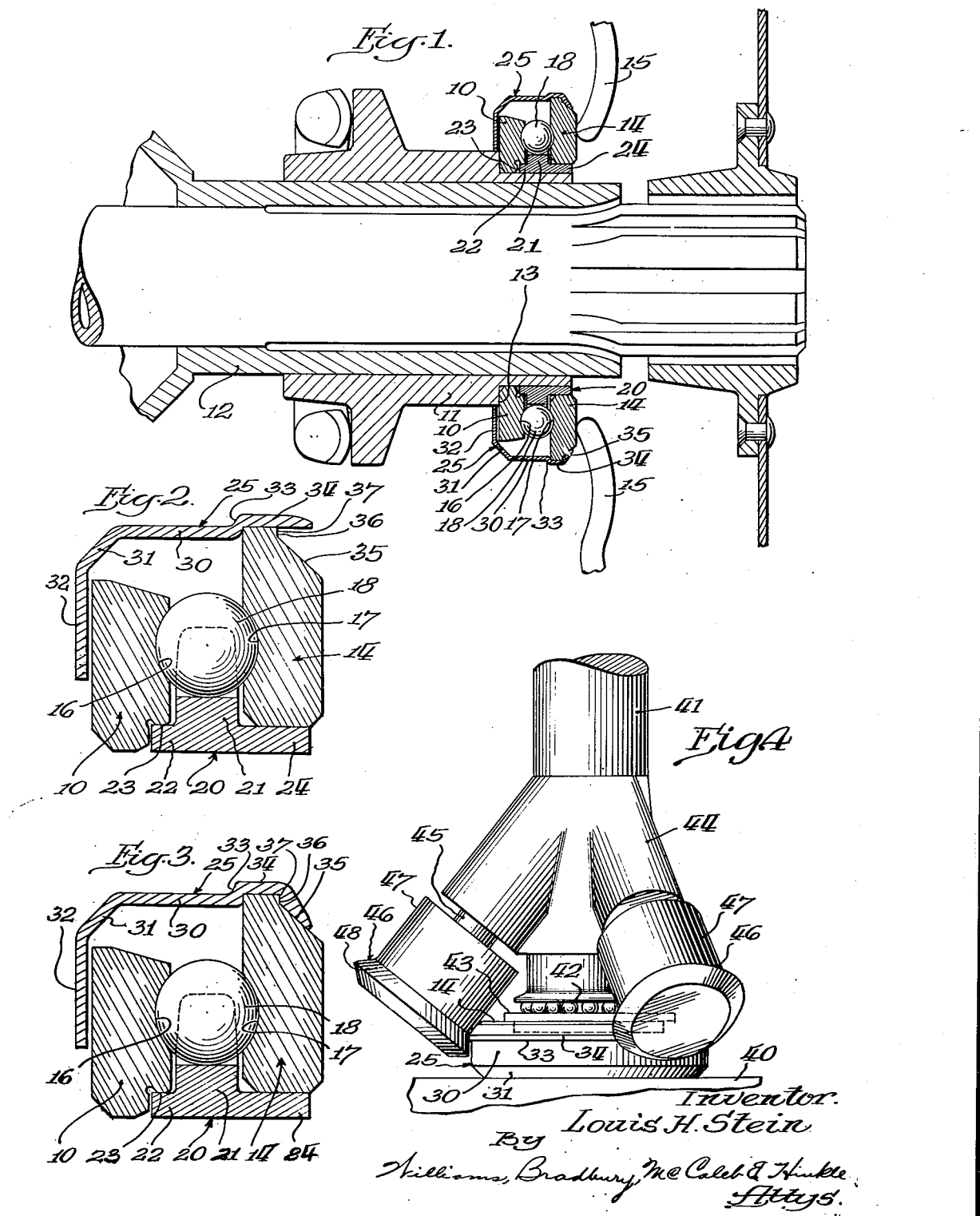

2,230,471

UNITED STATES PATENT OFFICE 2,230,471

ANTIFRICTION BEARING

Louis H. Stein, Chicago, Ill., assignor to Aetna Ball Bearing Manufacturing Company, Chicago, Ill., a corporation of Illinois Application October 13, 1938, Serial No. 234,795

4 Claims. (Cl. 308—187.1)

My invention relates to antifriction bearings and especially to ball thrust bearings such, for example, as are employed as clutch release bearings in automobiles.

The present invention is concerned with securing a better seal between the free race and the shell which it carries.

In this type of thrust bearing the free race and the shell carried by it are generally so arranged that they form an annular grease containing reservoir. Because the free race and shell which outwardly define this reservoir are often rotating at very high speeds, the grease is subjected to a very considerable centrifugal pressure which readily finds a path of leakage for the grease if the shell be imperfectly sealed to the free race ring.

The constructions heretofore used in spinning the shell onto the free race ring, as well as other expedients for sealingly mounting the shell upon the free race, have not proved satisfactory because of imperfections in the seal which, under the high centrifugal pressure of the grease as explained, cause leakage. By a simple change in the structure of the parts and the method of their assembly—and without perceptibly increasing the cost of the parts or the cost of their assembly—I have achieved a mounting of the shell upon the free race ring with a reliably perfect seal. Observations in extensive production and field use have shown that my improvement is eminently suited for commercial production and can be relied upon to provide a perfect seal which is not only initially obtained, but maintained for the life of the bearing.

The maintaining of a seal to prevent leakage of grease from the reservoir within the bearing is important, because in present-day automobile practice the clutch release bearings are calculated to run indefinitely without further grease than that with which they are packed at the factory. The clutch release bearing is thus one which does not receive routine service station lubrication to preclude its running dry. If one of these clutch release bearings leaves the factory with a defective seal between the shell and the free race ring, or if one subsequently develops due to constant vibration, for example, that bearing will run dry because it has no routine lubrication. That necessitates the renewal of the clutch release bearing, with the attendant large expense to the motor car owner of tearing down the clutch.

As an exemplary application of my invention I have here illustrated it as incorporated in a clutch release bearing of the type shown in my Patent No. 1,958,725 of May 15, 1934, but more especially as shown in my application Serial No. 175,779 filed November 22, 1937, now Patent No. 2,140,818, of December 20, 1938. The latter application is concerned with the solution of the problem of leakage in the clearance passage between the distant face of the fixed race ring and the embracing flange of the shell, whereas the present invention, as stated, is concerned with the effective elimination of leakage between the shell and the fixed race ring by which it is carried.

In the drawing:

Fig. 1 is a diagrammatic section of a clutch release mechanism including a clutch release bearing incorporating the present invention;

Fig. 2 is a radial section of the clutch release bearing upon an enlarged scale in its assembly position just prior to the operation of spinning the shell onto the free race;

Fig. 3 is a similar radial section after the spinning operation is completed; and Fig. 4 is a somewhat diagrammatic elevation of apparatus which may be employed for this spinning operation.

In the exemplary clutch release bearing here used to illustrate an application of my present invention, the fixed race 10 is a drive fit on a sliding or floating hub 11, reciprocably mounted on the stationary tubular support 12, the race ring 10 abutting a shoulder 13 on the sliding hub 11. The sliding hub, it will be understood, is reciprocated by the conventional clutch pedal through the clutch fork shown.

The outer face of the free race ring 14 is contacted by a plurality of radially arranged clutch release levers or fingers 15. The race rings 10 and 14 have the conventional ball race grooves 16 and 17, respectively. The arcuately spaced balls 18 are disposed in transverse openings 19 in the ball retainer ring 20.

Pursuant to the improvement set forth in my Patent No. 1,958,725, the retainer ring 20 carries a hub portion 21, which has a sliding fit on the shaft, the shaft in this instance being the hub 11. One end of the hub 21 extends as an annular flange 22 into a counterbore 23 in the fixed race ring 10, the counterbore and the flange 22 providing a running fit. The passage end of the hub extends as a wider annular flange 24 which has a running fit in the bore of the free race ring 14. Thus, of the three rings 10, 14 and 20, only the fixed race ring 10 has a drive fit on the shaft; the other rings have a running fit relative to each other and to the shaft. The purpose of this arrangement is to enable the retainer ring better to hold the balls in alignment with the grooves, especially when the thrust load is relieved and subsequently re-assumed. Because of the continual slight wear of the retainer ring against the race rings and shaft, I prefer to form the retainer ring of a self-lubricating metal as, for example, the phosphor high lead content bronze or the oil impregnated porous bearing metal mentioned in my prior patent.

The component parts are preassembled into a unit by a stamp or spun sheet metal jacket or shell 25 embracing the two race rings. The shell has a deep vertical flange 26 loosely embracing the fixed race ring 10 with a normal clearance of some .005" and fixedly embracing the free race ring 14 to rotate therewith.

The shell 25 comprises a cylindrical portion 30 which is extended at one end, through an obliquely chamfered corner portion 31, into an inwardly directed vertical flange 32 which lies in a plane at a normal to the axis and closely overlies the back face of the fixed race ring 10.

Toward its other end the cylindrical portion 30 of the shell extends through a pre-formed offset or shoulder 33 into a cylindrical rim portion 34 in the form in which the shell is pre-formed. The enlarged cylindrical ring portion 34, as shown in Fig. 2, is adapted to receive the rim of the free race ring 14 with the annular running edge formed by the intersection of the ball face of the free race ring 14 and its rim lying against the shoulder 33.

The outer corner of the free race ring 14, remote from its ball face, is chamfered at an angle of about 35 or 40 degrees to the axis, as indicated at 35, leaving a rim face of about 40% of the thickness of the free race ring. Especial attention is directed to the relative contours of the rim face and the chamfer 35. The chamfer is not extended obliquely all of the way to the rim face. Instead, there is a vertical cut 36 inwardly from the rim face forming a right-angled annular edge 37. The cut 36 spaces the proximate edge of the chamfer from the rim face.

While the parts are in the relative position of Fig. 2, and while the free race ring 14 is braced axially against the shell to hold the near peripheral edge of the race ring against the shoulder 33, the initially cylindrical rim portion 34 of the shell is spun against the rim face of the free race ring, and spun down upon the chamfer 35 and at the same time over the edge 37 and against the cut or shoulder 36.

The peculiar efficacy of this construction in affording a reliable and perfect seal is attributable largely to the character of the material of at least the pertinent portions of the race ring and of the shell. The shell is pre-formed—by stamping for example—from a relatively soft, low carbon, cold rolled sheet steel. On the other hand, the free race ring is surfaced with a high carbon steel which is virtually of tool steel hardness as the result of a carbonizing heat treatment which hardens the surface somewhat after the fashion of case hardening, but to a considerably greater depth, as is indicated by the cross-hatching of the race ring in Figs. 2 and 3.

As a result of the forceful spinning of the relatively soft shell onto the profile of the very hard tool-steel-like race ring, the initially cylindrical rim portion of the shell is not merely bent around the proximate profile of the race ring; the salient corners of the race ring actually cut into the metal of the shell to provide a more perfect seal. As a result of the combined action of cutting and flowing upon the relatively soft metal of the shell, a particularly effective and perfect seal is attained at both salient edges of the rim face of the race ring and, in addition, the shell is tightly pressed against the rim face, against the shoulder at the cut, and against the surface of the chamfer.

In addition to these sealing edges and surfaces, spinning of the metal of the shell, in conjunction with the cutting of its metal and the flowing of its metal, results in an internal contractive strain in the metal of the shell which bridges between the two edges of the rim face, permanently clamping the salient edges of the rim face between the cuts that have been made into the stock of the shell. This contractive strain is incorporated in the mentioned bridging portion of the shell as the result of the axial pull upon the shell stock at that region by the spinning of the end of the shell over the chamfer while at the same time cutting the salient edge of the rim face into the stock of the shell.

In Fig. 4 I have illustrated somewhat diagrammatically a device for performing this final spinning operation. The bearing, with the parts in the relation of Fig. 2, is placed upon a table 40 with the free race ring uppermost. The lower end of a depending rotary spinning shaft 41 carries a thrust bearing 42, the lower or stationary race 43 of which is conformed to enter the bore of the fixed race ring 14 to center the bearing assembly. The spinning head 44 also carried at the lower end of the shaft 41 presents a set of three obliquely radial studs 45, each of which carries a spinning roller 46.

Each roller 46 has a cylindrical portion 47 arranged at substantially the angle of the chamfer 35 and a flange-like surface 48 which comes into tangency with the cylindrical portion of the shell opposite the rim face of the race ring, along a vertical line. By moving the rotating head 44 downwardly toward the table (or, alternatively, moving the table 40 upwardly), the upper edge of the shell is engaged first by the flange-like portions 48 of the rollers and then directed inwardly along the cylindrical portions 47 of the rollers which spin the initially cylindrical rim portion of the shell inwardly against the chamfer of the race ring. Axial thrust through the thrust bearing 42 presses the then lower edge of the race ring into the shoulder 33, cutting itself a more perfect seat. The flange-like portions 48 of the rollers serve to press the shell very tightly against the rim face of the race ring and to this end the line of tangency of the flange-like portions 48 with the shell may be slightly out of the vertical to supply a camming action.

Having thus described and illustrated an exemplary embodiment of my invention, what I claim is:

1. An antifriction thrust bearing comprising a free race ring, a fixed race ring opposed thereto, antifriction elements rolling between the opposed faces of the rings, the rim face of the free race ring being annularly sharp-edged at its near corner and chamfered at its remote corner leaving a remote-facing shoulder between the chamfer and the remaining face of the ring with an annular sharp edge where the shoulder and remaining rim face join, and a grease retaining shell fixedly carried by the free race ring, the shell being of sheet metal of hardness and elasticity in the order of that of a relatively soft, low carbon, cold rolled sheet steel and comprising a cylindrical portion flanged inwardly at one end to embrace the remote face of the fixed race ring and adjacent its other end presenting a shoulder receiving the said near sharp edge of the free race ring and extending therebeyond over the said remote sharp edge of the free race ring and its shoulder and along the chamfer, the metal of the free race ring which forms its said edges being hardened to the order of tool steel hardness, whereby the edges cut into the shell to form a cut seal therewith.

2. An antifriction thrust bearing according to claim 1, in which the radial height of the shoulder is in the order of the thickness of the stock of the shell.

3. As a member of an antifriction thrust bearing, a free race ring of hardened steel presenting a rolling face for antifriction elements and a narrow rim face presenting annular, substantially right-angled sharp edges at the near and remote edges of the rim face, and at its outer remote corner being chamfered in the order of forty-five degrees with a remote-facing shoulder between the chamfer and rim face, and a grease retaining shell of sheet metal of hardness and elasticity in the order of that of a relatively soft, low carbon, cold rolled sheet steel fixedly carried by the ring and comprising a generally cylindrical portion embracing the rim face and shouldered to receive the said edges of the ring and extending along the chamfer in intimate contact therewith, the hardened steel of said edges being cut into the soft metal of the shell to seal the shell to the ring.

4. A bearing member according to claim 3, in which the radial height of the shoulder is in the order of the thickness of the stock of the shell.

LOUIS H. STEIN.